United States Patent [19]
Ballentine et al.

[11] Patent Number: 4,758,407
[45] Date of Patent: Jul. 19, 1988

[54] PB-FREE, TIN BASE SOLDER COMPOSITION

[75] Inventors: Richard E. Ballentine, Montevallo, Ala.; Joseph W. Harris, Cincinnati, Ohio

[73] Assignee: J.W. Harris Company, Cincinnati, Ohio

[21] Appl. No.: 67,268

[22] Filed: Jun. 29, 1987

[51] Int. Cl.$^4$ .................... C22C 13/02; C22C 13/00
[52] U.S. Cl. .................................. 420/560; 420/561
[58] Field of Search ............................ 420/560, 561

[56] References Cited
U.S. PATENT DOCUMENTS
4,695,428  9/1987  Ballentine et al. ................. 420/561

FOREIGN PATENT DOCUMENTS
2818099  11/1979  Fed. Rep. of Germany ...... 420/561
640831   1/1979   U.S.S.R. ............................ 420/561

Primary Examiner—L. Dewayne Rutledge
Assistant Examiner—Robert L. McDowell
Attorney, Agent, or Firm—Lynda E. Roesch

[57] ABSTRACT

A lead free, cadmium free tin and tin/antimony based solder alloy having a wide melting range for joining copper tubes and brass pipe and fittings. The non-toxic tin based solder composition has a range of 92.5–96.9% tin, 3.0–5.0% copper, 0.1–2.0% nickel and 0.0–5.0% silver. The non-toxic tin/antimony based solder composition has a range of 87.0–92.9% tin, 4.0–6.0% antimony, 3.0–5.0% copper, 0.0–2.0% nickel and 0.0–0.5% silver and is especially suited for plumbing applications having tight loose fitting solder joints which are exposed to potable water.

11 Claims, No Drawings

PB-FREE, TIN BASE SOLDER COMPOSITION

BACKGROUND

This invention relates to a novel non-toxic solder composition. The present invention is particularly concerned with the provision of a solder composition especially adapted for joining copper tubings, brass pipe and brass fittings to be used in plumbing.

There is ample evidence lead is significantly toxic, and it has long been known that lead in drinking water can contribute to high blood levels of lead. Historically, lead contamination of drinking water has originated from lead service pipe which leached lead into water. Lead pipes were common one hundred years ago, but they have been replaced by copper or plastic pipe.

Soldering is a well known and well accepted means for securing in a permanent fashion metal parts. Solder material must have the capacity to form metallurgical bonds with the two base metals that are to be joined. The bonding process results in the formation of an alloy in the surface of the base metal characterized by atoms of the soldering composition interspersed between atoms of the base metal.

The soldering material must be free flowing to fill the capillary and yet have ability to bridge gaps or form small fillets. The solder metal fills the joint by capillary attraction. When the solder is heated to a molten state, it exists as a round droplet as a result of the attraction of the molecules within the alloy for each other. This attraction is commonly referred to as surface tension. As the solder or filler metal enters the joint area, the molecules are attracted to the base metal. This causes a disruption in the natural rounded droplet stated and results in wetting the walls of the base and filling the capillary. The metal returns to a curved state and repeats the wetting process until the length of the joint is filled.

The bond strength is dependent on the nature of the base metals, the nature of solder metal, the thickness of the capillary, the compatibility of the base metal and the solder metal, and the solder temperature. Joining of the copper tube and pipe can be achieved by brazing or low temperature soldering. Brazing, however, anneals the tubing, thereby softening the metal. Brazing requires high temperature, longer heating times and poses potential fire hazards when joining water tube with an open flame.

Copper tube and pipe are used extensively in residential and commercial drinking water systems. However, copper tubing and pipe have in the past been universally joined with lead-bearing solders. There is a mounting evidence these solders may affect drinking water quality. Most importantly, since lead accumulates in the body, lead leaching is a serious health threat, especially in fetuses and children. The medical literature fully documents the health hazards high levels of lead pose.

While lead will corrode in potable water, certain factors influence corrosion rates. Water-induced corrosion in plumbing is electrochemical in nature. Soft, low pH level, acidic water is more aggressive and results in greater galvanic lead corrosion. Much of the untreated public water supply in the eastern, southeastern and northwest portions of the United States is typified by these characteristics. This phenomenon, then, affects a large percentage of the population and merits serious attention.

In the past, state governments have taken steps to reduce potential contamination of the potable water supply by restricting use of lead-bearing solders in copper tubing and pipe adapted for drinking water systems. Now that the federal government has banned the use of lead solders in potable water systems, the industry has searched for suitable alternate solders.

The most popular plumbing solder up until the present has been comprised of 50% lead and 50% tin. Commonly known as 50/50, the tin-lead solder composition exhibits properties which are particularly suitable for plumbing applications, including the ability to fill large gaps in the joint at low working temperatures.

A well designed solder joint requires close alignment of the two pieces to be joined in order to form a capillary into which the solder flows. As a practical matter however, because the pieces are not always symmetrical, especially in large copper tube or pipe section, a tight fit is often difficult to hold and frequently large gaps must be filled. In the past, a plumber could easily seal both tight and loose fitting joints with tin-lead solder which exhibits the necessary physical properties to do both well. Many of the newly developed solder alloys approach the low working temperature of the tin-lead solder, but none exhibit the same gap filling properties.

Unlike pure elemental metals which have a melting point, most alloys, with some few exceptions called eutectics, exhibit a melting range. That is, they start to melt at one temperature, called the solidus, but are not entirely liquid until they reach a higher temperature, the liquidus. Between these two temperatures, sometimes referred to as the pasty range, both solid and liquid phases exists. The chemical composition of each phase, however, differs. Specifically, if the alloy is held at any given temperature within the melting range both the liquid and solid phases will have chemical compositions different from the alloy before heating to the melting range. The liquid portion is rich in those elements which tend to lower the melting point. Conversely, the solid portion is rich in those elements that tend to increase the melting point. The solid phase, if separated from the liquid, would have a melting point above the liquidus of the original alloy and would not melt until the liquidus temperature is exceeded by a significant amount. This phenomemon is termed liquation and is usually considered an undesirable property in soldering alloys.

Alloys with a wide melting range tend to liquate more readily than alloys having a narrow melting range. The inclusion of more than 2% copper to a solder composition increases the melting range significantly.

Generally alloys with wide melting ranges have been avoided for use as solders because of the possibility of serious liquation problems. In fact, according to Manko in his book *Solders and Soldering* copper is considered a contaminant rather than an alloying element. Copper rapidly raises the liquidus temperature and widens the melting range of most solders making them subject to liquation. This invention to the contrary takes advantage of this fact to cover the complete range of joint spacings encountered in the field. Even though copper is considered a contaminant by experts, we have discovered that copper, in certain concentrations, added to tin alloys, can widen or narrow the melting range. We have also discovered that nickel has a similar effect, and indeed, nickel may be even more effective in widening or narrowing the melting range of the alloy, especially tin-antimony alloys.

According to the Copper Development Association and the Tin Research Institute, copper in the 3% range has been added to tin and used as a filler metal in Europe. Our discovery goes beyond this to suggest that these alloys could be much improved for filling large gaps by adding still higher concentrations of copper and/or nickel. The American Society for Metals, in the Metals Handbook, describes alloys of tin, antimony and copper which are commercially available in the tin-rich area, but no mention is made of their use as a solder. The American Welding Society also fails to list them in their Soldering Manual as potential filler metals. We have discovered that certain combinations of copper with or without the addition of nickel, when added to tin or tin/antimony as a solder present an opportunity to fill very tight capillaries while at the same time, if allowed to liquate, offer the operator an equal opportunity to fill large gaps with ease.

The composition of the present invention is not disclosed or suggested by any domestic or foreign patents. U.S. Pat. No. 4,464,147 issued to A. W. Cadman for "Alloy" discloses the addition of aluminum in various amounts to babbitt metal in order to refine the grain size, thus making the metal more suitable for use in bearings. This patent discloses an alloy comprising copper, tin and antimony, but the addition of aluminum to the alloy makes the composition entirely unsuitable for use as a solder.

U.S. Pat. No. 1,355,202 issued to M. A. Willoughby for Internal Combustion Engine Cylinder Soldering Metal Composition describes a solder for the specific purpose of filling imperfections in cast cylinder bores. Willoughby discloses a solder which is a hard, high pressure metal with a high melting point. Willoughby discloses a composition of 79.15% tin, 7.29% antimony, 6.49% copper and 7.07% zinc. The copper and antimony percentages are significantly higher than the amounts used in the present composition. This alloy would be unsuitable for general purpose soldering.

A solder composition for aluminum and its alloys comprising zinc and copper in combination with tin and a small amount of silver is disclosed by U.S. Pat. No. 1,437,641 issued to Ferriere, et al. The composition disclosed makes no use of antimony and does not have properties necessary for general purpose solder composition.

J. V. O. Palm, et al. patented a Bearing Alloy in U.S. Pat. No. 2,059,019. The Palm, et al. patent covers the addition of tellurium metal to a babbitt or bearing alloy to increase resistance to fatigue. The patent claims an increase in fluidity at a pouring temperature which is much higher than any temperature used for soldering.

U.S. Pat. No. 3,607,253 issued to Cain, et al. for a tin base solder alloy discloses a modification of a tin base solder alloy to increase creep strength and other mechanical properties. The patent includes the addition of cadmium which is considered toxic and is prohibited in use in areas which contact food or water. This composition is totally unsuitable for potable water applications.

United Kingdon Pat. No. 2,146,354A discloses the addition of titanium to babbitt metal in order to refine the grain structure. Various other elements, including lead, cadmium, magnesium and beryllium oxide are also included in the composition making the composition unsuitable for soldering in plumbing applications.

Foreign Pat. No. 31.08.76-SU-400834 issued to Anikeev discloses a solder designed for joining nickel-plated siliconized graphite to steel. The copper and antimony ranges are well beyond the scope of present disclosure and the addition of titanium would seriously compromise the flow properties necessary for normal soldering.

Foreign Pat. No. 04.07.75-JA-082884 discloses a solder designed for use in semiconductor applications. The high silver content of 5%–35% by weight renders the composition economically unfeasible for a general purpose soldering.

Accordingly, an object of the present invention is to provide a non-toxic solder composition, having desirable flow and wetting properties. Another object of the present invention is to provide a lead-free cadmium-free solder composition with a suitable melting range and exhibiting the appropriate wetting and flow characteristics. A further object of this invention is to provide a lead free solder composition with the appropriate strength for use in plumbing systems that carry potable water. Still a further object of this invention is to provide a low-cost, non-toxic solder composition for joining brass or copper tubing and pipe. Yet another object of this invention is to provide a non-toxic solder capable of filling large gaps and tight capillaries in joints equally well.

SUMMARY OF THE INVENTION

The above objects and advantages are achieved according to the invention by providing a solder composition comprising by weight 87.0–92.9% tin, 4.0–6.0% antimony, 3.0–5.0% copper, 0.0–2.0% nickel and 0.0–0.5% silver or 92.5–96.9% tin, 3.0 –5.0% copper, 0.1–2.0% nickel, 0.0–0.5% silver. The novel composition offers a sufficiently wide melting range enabling easy soldering of most joints. The addition of antimony or of a small amount of silver has the advantage of lowering the liquidus and improving the wettability of the solder. The addition of nickel, even in small amounts, is extremely effective in widening the melting range, improving wettability, increasing strength and enhancing the ability to cap, i.e. form a small fillet, at the joint juncture. A typical alloy of 5% antimony, 4% copper and the balance tin has a melting range of 460° F. to 620° F. and is suitable for filling both tight and loose fitting joints An optimum composition by weight comprises 91.0% tin, 5.0% antimony, 3% copper, 0.2% nickel and 0.1% silver. This solder composition has a melting range of 460° F. to 630° F. Its flow properties make it equally useful for both tight fitting joints and poorly fitting joints. Excellent joints have been made with this solder at temperatures just slightly above the solidus temperature and well below the true liquidus temperature.

DETAILED DESCRIPTION OF THE INVENTION

The present invention comprises lead-free solder formulations with melting and flow characteristics capable of filling tight capillaries as well as large gaps between pipes and fittings in joints. The composition is not listed in current federal, military or commercial solder specifications.

Liquation, as explained previously, involves the separation of the solid and liquid phases of an alloy within its melting range. The composition of both the solid and liquid portions vary continuously as the temperature within this range changes. So also, does the amount of each phase change with time and temperature. As an alloy is heated to its solidus, the temperature at which it starts to melt, a small amount of liquid is formed. In many cases, such as in solders of the nature disclosed herein, even though heat continues to be supplied, the temperature remains fairly constant until a specific amount of the alloy becomes liquid. The exact amount depends on the chemical composition of the alloy. As heat continues to be supplied, the temperature rises, more of the alloy becomes liquid and less remains solid until, at the liquidus temperature, the entire alloy is a liquid. At any point within the melting range that the liquid is separated, such as by flowing into the capillary of a joint, from the solid, liquation occurs. The remaining solid exhibits a melting temperature higher than the original liquidus temperature of the alloy due to the continuing change of composition during melting. The alloys of the present invention are designed to take advange of this phenomenon.

Specifically, the present invention describes a solder alloy consisting of a base of tin or tin-antimony to which copper and/or nickel is added. Copper and/or nickel widens the melting range in addition to enhancing the abililty of the solder to fill wide gaps in poorly fitted joints. Silver may additionally be used to lower the melting range so that the alloy offers a range of useful soldering temperatures.

According to these compositions, if the base metals of a properly fitted joint are heated to a temperature within the melting range of the solder, it will easily flow into the capillary. However, if the fit of the base metals cannot be held within a few thousandths of an inch, and large gaps are to be filled, the technique involves heating to just above the solidus temperature, thus allowing the liquid portion to fill the capillary and leaving the higher melting solid portion to fill the larger gaps.

The tin based solder composition exhibiting the desired melting range and wetting and flow properties comprises by weight as follows:
92.5–96.9% tin
3.0–5.0% copper
0.1–2.0% nickel
0.0–0.5% silver The tin/antimony based solder composition exhibiting the desired melting range and wetting and flow properties comprises by weight as follows:
87.0–92.9% tin
4.0–6.0% antimony
3.0–5.0% copper
0.0–2.0% nickel
0.0–0.5% silver All of the following examples show typical tensile strength of 6,000 P.S.I or over and elongation for 2" of 40–50%.

EXAMPLE A

Example A was prepared, by weight, as follows
Tin (Sn) 96.8%
Copper (Cu) 3.0%
Nickel (Ni) 0.2%
This solder has a solidus of 460° F. and a liquidus of 640° F.

EXAMPLE B

Example B was prepared, by weight, as follows:
Tin (Sn) 95.5%
Copper (Cu) 4.0%
Nickel (Ni) 0.3%
Silver (Ag) 0.2%
The solidus temperature is 460° F. and the liquidus temperature is 710° F.

EXAMPLE C

Example C was prepared, by weight, as follows:
Tin (Sn) 90.5%
Antimony (Sb) 4.0%
Copper (Cu) 5.0%
Silver (Ag) 0.5%
The solder had a melting range of 423° F. to 661° F.

EXAMPLE D

Example D was prepared, by weight, as follows:
Tin (Sn) 89.8%
Antimony (Sb) 5.0%
Copper (Cu) 5.0%
Silver (Ag) 0.2%
The solidus of this solder was 458° F., and the liquidus was 658° F.

EXAMPLE E

Example E was prepared, by weight, as follows:
Tin (Sn) 91.5%
Antimony (Sb) 5.0%
Copper (Cu) 3.0%
Nickel (Ni) 0.5%
This solder had a solidus of 459° F. and a liquidus of 735° F.

EXAMPLE F

Example F was prepared, by weight, as follows:
Tin (Sn) 90.7%
Antimony (Sb) 5.0%
Copper (Cu) 4.0%
Nickel (Ni) 0.2%
Silver (Ag) 0.1%
The solidus temperature of this composition was 460° F. The liquidus temperature of this composition was 660° F.

EXAMPLE G

Example G was prepared, by weight, as follows:
Tin (Sn) 91.7%
Antimony (Sb) 5.0%
Copper (Cu) 3.0%
Nickel (Ni) 0.2%
Silver (Ag) 0.1%
This solder had a solidus of 460° F. and a liquidus of 610° F.

This solder composition is adaptable in the following forms, sizes and weights. The composition may be manufactured as solid round wire in diameters from 0.020–0.250 inches. It is also suitable for solder wire cored with rosin, organic or inorganic fluxes in diameters of 0.020–0.250 inches.

The new solder may be preformed in sizes, shapes and rounds to meet special requirements. The new composition is easily manufactured in pigs and cakes or ingots, retangular or circular in shape. Bars in numerous cross sections, weights and lengths would also provide appropriate forms for the new composition.

In addition, the new solder may be manufactured in the form of powder-spherical balls in various sizes from U.S. Sieve No. 3 (27.62 meshes per linear inch) to U.S. Sieve No. 325 (323.00 meshes per linear inch).

The new composition may be prepared as paste. This would entail mixing a powder form of the solder with a suitable flux to form a solder paste. The solder is also suitable for use as foil, sheet or ribbon in various thicknesses and widths.

We claim:

1. A lead-free metal solder composition comprising, by weight:
   0.1–2.0% nickel
   3.0–5.0% copper
   4.0–6.0% antimony
   87.0–92.9% tin 2. A lead-free metal solder composition comprising, by weight:
   0.1–0.5% silver
   0.1–2.0% nickel
   3.0–5.0% copper
   4.0–6.0% antimony
   87.0–92.9% tin 3. A lead-free metal solder composition comprising, by weight:
   0.1–0.5% silver
   3.0–5.0% copper
   4.0–6.0% antimony
   87.0–92.9% tin 4. A lead-free metal solder composition comprising, by weight:
   0.1–2.0% nickel
   3.0–5.0% copper
   93.0–96.9% tin 5. The composition of claim 4, said metals comprising by weight:
   0.2% nickel
   3.0% copper
   96.8% tin 6. The composition of claim 3, said metals comprising by weight:
   0.5% silver
   5.0% copper
   4.0% antimony
   90.5% tin 7. The composition of claim 3, said metals, comprising by weight:
   0.2% silver
   5.0% copper
   5.0% antimony
   89.8% tin 8. The composition of claim 2, said metals comprising by weight:
   0.1% silver
   0.2% nickel
   3.0% copper
   5.0% antimony
   91.7% tin 9. The composition of claim 1, said metals comprising by weight:
   0.5% nickel
   3.0% copper
   5.0% antimony
   91.5% tin 10. A lead-free metal solder composition comprising by weight:
    0.1–0.5% silver
    0.1–2.0% nickel
    3.0–5.0% copper
    92.5%–96.8% tin 11. The composition of claim 10, said metals comprising by weight:
    0.2% silver
    0.3% nickel
    4.0% copper
    95.5% tin

* * * * *